Feb. 13, 1934.    A. W. KEEN    1,947,090
APPARATUS FOR MAKING RUBBER FILAMENTS
Filed July 24, 1931    2 Sheets-Sheet 1

INVENTOR
ALEXIS W. KEEN
BY Walter S. Pipes
ATTORNEY

Feb. 13, 1934. A. W. KEEN 1,947,090
APPARATUS FOR MAKING RUBBER FILAMENTS
Filed July 24, 1931 2 Sheets-Sheet 2
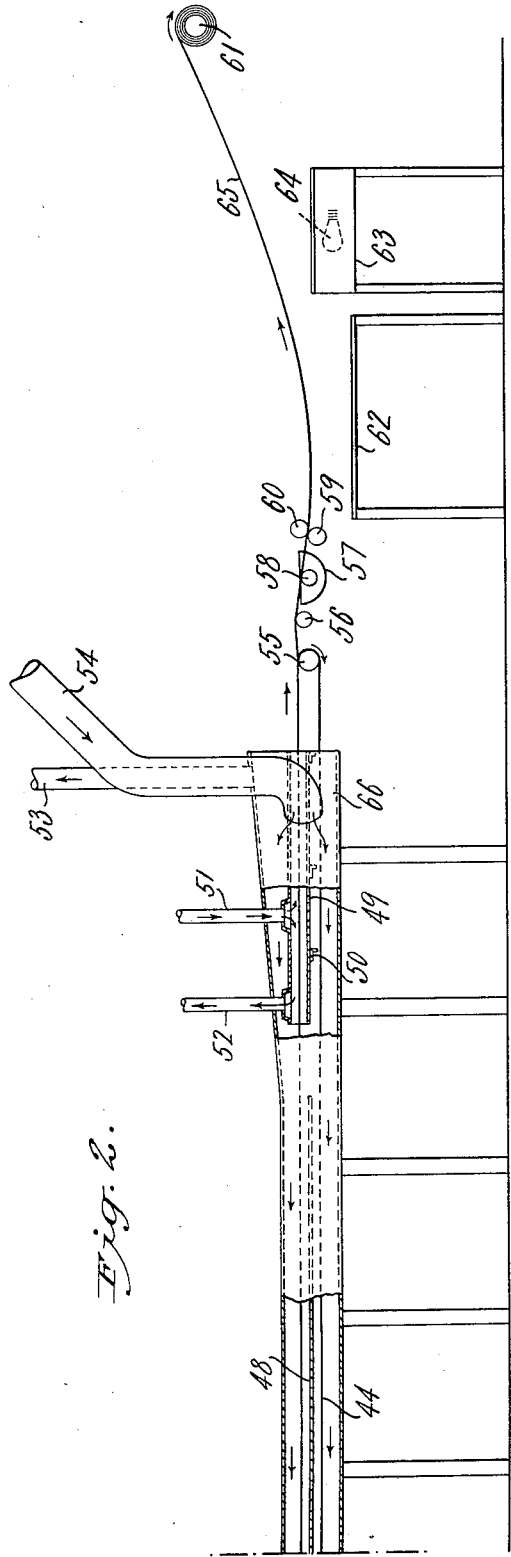
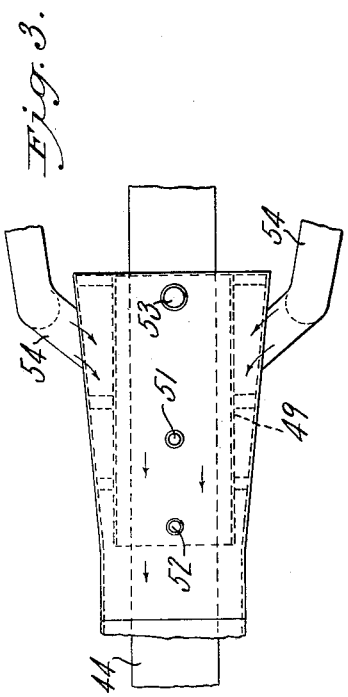
INVENTOR
ALEXIS W. KEEN
BY
ATTORNEY Patented Feb. 13, 1934

1,947,090

UNITED STATES PATENT OFFICE 1,947,090

APPARATUS FOR MAKING RUBBER FILAMENTS

Alexis W. Keen, Passaic, N. J., assignor to Revere Rubber Company, Providence, R. I., a corporation of Rhode Island Application July 24, 1931. Serial No. 552,850

10 Claims. (Cl. 18—8)

This invention relates to the production of rubber filaments from aqueous dispersions of rubber.

In the commercial manufacture of rubber thread, one practice has been to form a sheet of rubber of the desired thickness as by calendering, and then to cut the sheet into thread of desired width by regulating the distance of the cut from a previously cut edge. Such procedure is difficult of accomplishment especially in the smaller thread sizes and results in certain undesirable characteristics in the quality of the thread produced such as ragged edges and lack of uniformity of cross section. The product, moreover, is not of unusual strength for the reason that it has been derived from milled rubber which is well known to be not as strong as the unmilled grainless rubber derived from latex.

In order to overcome the difficulties presented in the manufacture of small thread cut from rubber sheets, it has been proposed to manufacture rubber thread directly from aqueous dispersions of rubber by streaming the same into a coagulant, washing, drying, or otherwise treating, and vulcanizing the product. A process for the manufacture of such thread is described and claimed in the patent to Ernest Hopkinson and Willis A. Gibbons, No. 1,545,257, patented July 7, 1925. A thread manufacture in accordance with such processes may be made in desired shapes and sizes and when made from latex possesses unusual strength, stretching and ageing qualities. A rubber thread made from aqueous rubber dispersions has smooth straight edges and is uniform in cross-section, resists chafing when associated with fibrous covering material or with threadlike rubber elements and has other advantages over thread made by previously practiced processes.

It is the object of this invention to provide an improved apparatus for manufacturing rubber thread from aqueous dispersions of rubber and one which is particularly adaptable for making fine thread. By such an apparatus it is possible to make rubber thread as small as 1/150 of an inch in maximum cross sectional dimension, and smaller.

Other objects and advantages of the invention will more clearly appear when reference is had to the following specification and drawings:

In the drawings:

Fig. 2 is a representation in elevation of the remainder of the apparatus, being a continuation of Fig. 1.

Fig. 3 is a plan view of one end of the drier showing the manner in which the vulcanizer is associated therewith.

Figure 1:
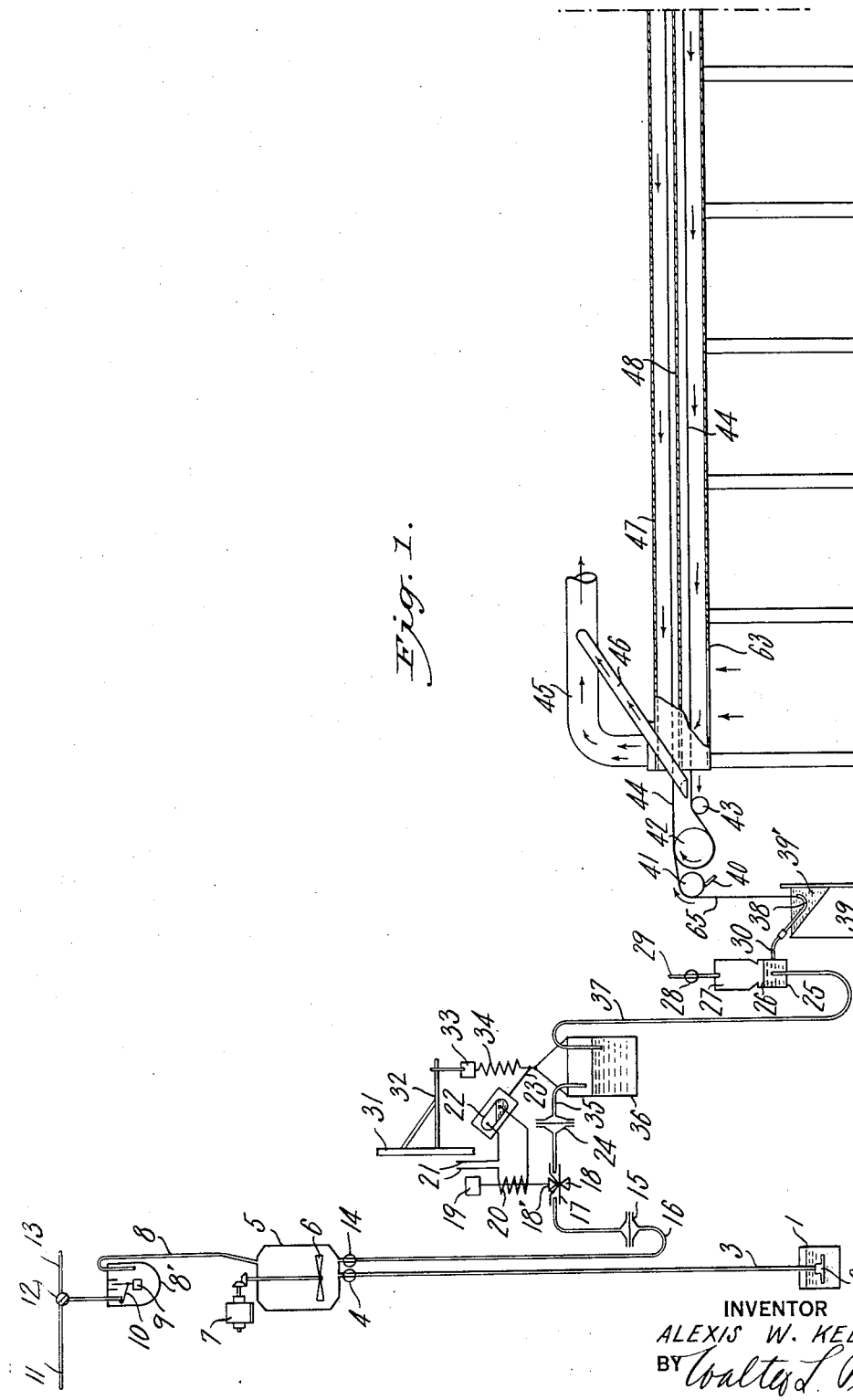
Fig. 1 is a representation in elevation of one end of the apparatus, being broken away for convenience intermediate the drier.

In making a very fine thread it is essential that the materials used be of a high state of purity not only free from undesirable foreign particles but also free from air bubbles. Toward this end supply tank 1 may be filled with a suitable aqueous dispersion of rubber, preferably latex of suitable characteristics and compounded with various ingredients such as sulphur for vulcanization, fillers, accelerators, anti-oxidants, pigments, etc. such as may be desired. The incorporated ingredients should be in finely divided state, and I have found that compounding materials, except sulphur, may be used which are reduced to a degree of subdivision characterized by the powdered state in which they are customarily used in rubber manufacturing. Sulphur, however, should be either in colloidal state or in solution since in fine filamentary materials made in accordance with this invention with the sulphur in ordinary powdered or crystal form, there is quite likely to result an inferior product full of visible pores or holes apparently due to "blowing".

From tank 1 the liquid is passed through a strainer 2 and raised into container 5 by connecting the same to a source of suction, for instance through pipe 11, container 8' and conduit 8. The strainer may be of any type which filters out undesirable foreign particles and allows those of the desired characteristics to pass through. During the filling of the container 5, the valve 4 is opened, valve 14 closed and valve 12 adjusted to place the container in communication with the source of vacuum through tank 8'. When the container is filled, valve 4 is closed, valve 12 positioned to provide for communication with the atmosphere through line 13, the apparatus thus being made ready for operation upon opening valve 14.

Agitator 6 driven through bevel bears by motor 7 is placed in operation in order to insure uniformity in the latex composition. The agitation is preferably continued for some time after the container 5 is filled and before the liquid is started through the feed regulating device by opening the valve 14.

Tank 8' is provided with a float 9 connected to valve 10 in the line leading to the vacuum source. When the valve 12 is turned to allow the vacuum to draw the liquid into container 5, it is possible that the valve 4 may be accidentally left open after the container is filled. In this event the tank 8' will be filled, float 9 will rise and thus close off the vacuum and prevent wastage of liquid.

The liquid flows from container 5 by gravity through line 16, strainer 15 and then through a solenoid pinch valve arrangement which consists of a piece of rubber tubing 17 disposed between pinch elements 18 and 18', the latter being connected to a weight 19 by a solenoid stem around which a coil 20 is wound. The valve is connected with the conduit 35 emptying into tank 36 and preferably passes through a strainer 24 disposed in the line.

A guide 31 may be provided with a sliding bracket 32 which is adjustable on the guide at any position and may carry a holder 33 with suitable means for adjustably holding spring 34 which supports container 36. The goose-neck conduit 37 may be provided to supply the liquid compound nozzle 38 or a manifold connecting a group of nozzles, which nozzle or nozzles are immersed in a bath of coagulating liquid such as acetic acid, in container 39. The container 36 with its suspension system may be arranged to provide a continuous supply of the aqueous compound to the nozzle or nozzles under a constant and predetermined hydraulic head in the manner now to be described.

At the base of the spring 34 is connected an arm 23 fixed to a mercury switch 22 provided with two contacts which are adapted to close the circuit through coil 20, wires 21 and a suitable source of electrical energy (not shown). Spring 34 should be adjusted so as to compensate exactly for the change in level in the container due to the depletion of and addition to the contents of the container, that is when the container is filled its level rises a certain distance and spring 34 should distend or lower the container the same distance. When the contents of the container are depleted its level sinks and the spring 34 should contract, due to the removal of weight, an amount sufficient to raise the container the same distance. The level is thus kept constant relative to a fixed point, allowing a constant hydraulic head to be exerted in conduit 37 and the remainder of the system which encloses the liquid. The filling and emptying of the container 36 may be accomplished automatically by means of the solenoid pinch valve arrangement in conjunction with the mercury switch. When the tank is filled the switch is tipped in the position shown, electrical connection providing for energization of the solenoid is broken and weight 19 acts on pinch member 18' to close the valve and prevent further addition to the contents of tank 36. Liquid, however, still runs through conduit 37 (the flow in which has been initiated by placing a suction on the line in order to obtain a syphon effect) thus depleting the content of the tank 36. When the level in this container descends to a predetermined point, the mercury switch will be moved into a relatively horizontal position and contact made in the line connected to the coil 20, whereupon the plunger is centered in the coil and raised against the force of weight 19 allowing liquid to again flow into container 36.

Conduit 37 preferably connects with container 25 which is disposed in the feed line to the nozzle or nozzles 38. Liquid in the container is preferably adjusted to just cover the top of the line 37 which adjustment is made by venting air through cock 28 into the atmosphere through line 29 the cock being closed when the desired level is reached. 27 is an air chamber which operates to cushion shocks in the line which might momentarily effect the size of the material to be made and also traps any air bubbles which may have found their way through the feed system. From container 25 line 30 leads to nozzle or nozzles 38. For convenience the flow of material through only one nozzle will be described.

The nozzle 38 is preferably constructed of small tubing in the end of which is inserted a section of fine capillary glass tubing whose orifice may vary depending on the size thread it is desired to produce. For example, an orifice, .016 inches in diameter will produce a finished thread .010 inches in diameter. Liquid flowing through this nozzle is streamed into the coagulant 39' and solidified into a very small wisp-like filament 65 which is pulled upward a short distance by roll 41 whence it is transferred onto belt 44. Roll 41 is driven at the same surface speed as belt 44 which is actuated by driving roll 42 or by rolls 42 and 55 arranged to revolve at the same surface speeds. A certain amount of coagulant is removed from the thread onto the roll 41; this may be removed by suitable means such as wiper 40 similar to the ordinary automobile windshield wiper. The travel of the streamed material through the bath and onto the drying conveyor 44 may be facilitated by increasing the specific gravity of the acid bath to an extent that the natural tendency of the rubber filament will be to flow at the surface and thus assist the mechanical means by which continuous travel of the material is maintained. It should be noted that at this point the thread is in freshly coagulated state and is not strong enough to be handled in any way other than by the simplest and most direct mode of advancement, and that the single roller 41, over which the thread is pulled by virtue of its frictional contact therewith, best serves this purpose. It should be also noted that owing to the very fine character of the rubber material streamed through the nozzle, the time of contact with the coagulating liquid need not be great, and for the purposes of this invention, a travel of from 1 to 6 inches through a coagulating bath is sufficient. Fine thread is so small that it absorbs little acid, and the maximum distance through which the acid has to diffuse in order to reach the surface of the thread and there be evaporated is very small, and consequently the thread need not be washed free of acid preparatory to entering into the dryer which vaporizes residual acid.

The belt 44 is preferably driven at a constant speed by driving roll 42 which revolves just fast enough to take the thread up from the roll 41. This belt may be passed through a drying tunnel 47 and carried horizontally therethrough over a metal surface 48. A heated gas from the blower may be introduced into the drying tunnel through pipes 54 and arranged to pass through the top duct in the direction indicated by the arrows on Fig. 2. It is desirable to circulate this drying gas in the bottom duct of the dryer to maintain the belt at elevated temperatures. The movement of drying gas in the top duct is counter to the direction of movement of the thread as it is carried to the right on the upper surface of the belt. It should be noted that due to the very fine character of the material produced, it is not necessary that the drying tunnel be of excessive length, in fact and it has been found that practical purposes are well served by the use of a drying tunnel as short as 36 feet for a belt speed of 27 feet per minute. The length of the drier required may also be reduced by increasing the temperature of the hot gas circulated therethrough, and I have found that the most satisfactory results are obtained by the use of a dryer of the length indicated where the drying gases are heated to temperatures from a minimum of 260° F. at the entrance end to a maximum of around 350° F., the temperature being gradually raised to the maximum at the end adjacent the vulcanizer. To aid in obtaining low temperatures at the entrance end the bottom of the dryer may be cut away, as at 63.

After passing through the dryer, the belt carrying the thread enters the vulcanizer 49. A superheated gas, and by "gas" I include vapors such as steam, may be introduced into the inner chamber of vulcanizer 49 through pipe 51. Part of this gas will travel toward the right of the apparatus shown in Fig. 2 while the rest travels toward the left, the respective currents exhausting from the vulcanizer through pipes 52 and 53. The drying belt continues through the vulcanizer as shown and enables the thread to come in intimate contact with the superheated gas which is preferably kept at a temperature of approximately 400° F. though this may be higher. It is understood of course that the pressure in the vulcanizer is normal atmospheric pressure which must necessarily be so in order to allow the belt to travel therethrough as shown. The drying belt passes over end roll 55 and then returns under the vulcanizer and through the bottom duct of the dryer to driving roll 42, small roll 43 acting as a tightener and shifting device. The hot drying gas from the pipe 54 passes around the vulcanizer 49 before entering the dryer proper, thus assisting in keeping the vulcanizer at the required temperature and also providing a means for preheating the apparatus before steam is introduced, preventing condensation when the apparatus is started. At the roll 55 the thread is passed over roll 56 and drawn over a talcing apparatus 58 by pinch rolls 59 and 60. The thread is thus talced and in completely vulcanized condition ready for handling preparatory to shipment from the factory. After passing through the pinch rolls the thread is drawn a suitable distance over table 62 for equalizing tension and an inspection table 63 which is arranged to give a background of diffused light under the thread when viewed from above, for instance by means of a frosted glass top under which an electric lamp 64 is positioned. The finished thread may be wound up by any suitable apparatus, for instance on beam 61, provided with a Reeves automatic speed regulator. Pipes 45 and 46 provide for a return circulation of the hot drying gases into pipe 54 and pipe 46 may be arranged at the front end of the dryer to suck up gases and fumes which might otherwise escape into the room.

It is obvious that a number of threads may be passed in parallel fashion to an apparatus constructed in accordance with the principles herein set out.

It can be seen that by the process herein described, it is possible to obtain a thread of extremely small cross sectional dimension which may be made from aqueous dispersions of rubber or rubber compositions and completely formed, dried, vulcanized, talced, and prepared for shipment in one continuous operation.

Thread manufactured by the apparatus of this invention is preferably composed of tough, unmilled grainless rubber derived from latex and possesses increased strength and stretching qualities over threads heretofore made by calendering and cutting operations; it is of uniform cross-section and possesses straight, true edges. In addition the tough nature of the material renders it suitable for resisting chafing when associated into elastic webbing such as is commonly used or as may be constructed by the use thereof. The material is so small that it may be successfully incorporated directly or after covering in articles of apparel and as such articles are subjected to continual stretching and flexing, it is apparent that the present invention serves a useful and critical need for material which will resist the chafing and rubbing action necessarily entailed by such use.

Although the apparatus disclosed herein is particularly adapted to the manufacture of fine filaments, it may be used with or without modification of construction, in the manufacture of larger filaments without departing from the principles herein set forth.

Without restricting the invention to the precise details set forth for purposes of illustration nor to an extent greater than is required by the prior art, I claim and desire to protect by Letters Patent:

1. An apparatus for making filaments from aqueous dispersions of rubber comprising, in combination, a coagulant bath, means for delivering an aqueous dispersion of rubber in a continuous stream of uniform quality and cross section into the coagulant bath, a hot gas drier, a hot gas vulcanizer, a continuously advancing conveyor in said dryer and vulcanizer, and means for conducting the coagulated stream directly from said coagulant bath onto said conveyor.

2. An apparatus for making filaments from aqueous dispersions of rubber comprising, in combination, a coagulant bath, means for delivering a continuous uniform stream of an aqueous dispersion of rubber into the coagulant bath, a hot gas dryer, a conveyor therein, means for continuously advancing the same, and means for transferring the coagulated stream directly from said coagulant bath onto said conveyor.

3. An apparatus for making rubber filaments from aqueous dispersions of rubber comprising, in combination, a coagulant bath, means for delivering a continuous uniform stream of an aqueous dispersion of rubber into the coagulant bath, a hot gas dryer, and means for transferring the coagulated stream directly from said coagulant bath to said dryer.

4. An apparatus for making rubber filaments from aqueous dispersions of rubber comprising, in combination, a coagulant bath, means for delivering a continuous uniform stream of an aqueous dispersion of rubber into the coagulant bath, a hot gas dryer, a vulcanizer, means for transferring the coagulated stream directly from said coagulant bath to said dryer, and means for continuously advancing said stream through said dryer and vulcanizer.

5. An apparatus for making rubber filaments from aqueous dispersions of rubber comprising, in combination, a coagulant bath, means for delivering a continuous uniform stream of an aqueous dispersion of rubber into the coagulant bath, a hot gas dryer, a vulcanizer, means for transferring the coagulated stream directly from said coagulant bath to said dryer, and a conveyor for continuously advancing said stream through said dryer and vulcanizer.

6. An apparatus for making rubber filaments from aqueous dispersions of rubber comprising, in combination, a coagulant bath, means for supplying an aqueous dispersion of rubber in a continuous stream of uniform cross-section into the coagulant bath, a dryer comprising a casing and a conveyor therein, a vulcanizer comprising a casing through which the drying conveyor passes, and means for conducting the coagulated stream directly from said coagulant bath onto said conveyor and through said dryer and vulcanizer.

7. An apparatus for making rubber filaments from aqueous dispersions of rubber comprising, in combination, a coagulant bath, means for supplying an aqueous dispersion of rubber in a continuous stream of uniform cross section into the coagulant bath, a hot gas dryer comprising a casing and a conveyor therein, a vulcanizer within the dryer casing and through which the drying conveyor passes, and means for conducting the coagulated stream directly from said coagulant bath on to said conveyor and through said dryer and vulcanizer.

8. An apparatus for making elastic filaments comprising, in combination, a dryer comprising a casing and a conveyor therein, means for delivering a continuous length of rubber filament to said dryer, and a vulcanizer associated with said dryer within the dryer casing.

9. Apparatus for making rubber filaments comprising, in combination, a dryer comprising a casing and a conveyor therein, means for supplying a continuous stream of rubber in filament form to the drying conveyor, and a vulcanizer associated with said dryer within the dryer casing and through which the drying conveyor passes.

10. An apparatus for the continuous treatment of rubber thread comprising, in combination, a dryer comprising a casing and having a conveyor passing therethrough, a vulcanizer associated with the dryer and positioned within the dryer casing at one end thereof, said vulcanizer comprising a casing through which the drying conveyor passes, means for passing a hot gas around the vulcanizer casing and within the dryer casing in a direction opposite to the direction of travel of the conveyor, and means for providing a hot vulcanizing medium within the vulcanizer casing.

ALEXIS W. KEEN.